United States Patent [19]
Jones et al.

[11] Patent Number: 6,006,295
[45] Date of Patent: Dec. 21, 1999

[54] TRANSLATOR WITH SELECTABLE FIFO FOR UNIVERSAL HUB CABLES FOR CONNECTING A PC'S PCMCIA OR PARALLEL PORTS TO VARIOUS PERIPHERALS USING IDE/ATAPI, SCSI, OR GENERAL I/O

[75] Inventors: Larry Lawson Jones, Palo Alto; Sreenath Mambakkam, San Jose, both of Calif.

[73] Assignee: On Spec Electronic, Inc., Santa Clara, Calif.

[21] Appl. No.: 08/869,624

[22] Filed: Jun. 5, 1997

[51] Int. Cl.[6] .............................. G06F 13/14; G06F 13/20
[52] U.S. Cl. .................................. 710/62; 710/8; 710/11; 710/63; 709/230; 395/500.48; 395/527; 340/825.04
[58] Field of Search .................................... 395/500, 882, 395/883, 200.6, 831, 828, 500.48, 527; 340/825.04; 710/62, 63, 11, 8; 709/230

[56] References Cited

U.S. PATENT DOCUMENTS

| | | | |
|---|---|---|---|
| 5,408,669 | 4/1995 | Stewart et al. | 395/750 |
| 5,430,847 | 7/1995 | Bradley et al. | 395/325 |
| 5,454,085 | 9/1995 | Gajjar et al. | 395/285 |
| 5,457,785 | 10/1995 | Kikinis et al. | 395/308 |
| 5,535,371 | 7/1996 | Stewart et al. | 395/500 |
| 5,540,597 | 7/1996 | Budman et al. | 439/77 |
| 5,540,601 | 7/1996 | Botchek | 439/502 |
| 5,570,002 | 10/1996 | Castleman | 323/285 |
| 5,576,698 | 11/1996 | Card et al. | 340/825.52 |
| 5,596,169 | 1/1997 | Baker et al. | 174/33 |
| 5,640,541 | 6/1997 | Bartram et al. | 395/500 |
| 5,729,204 | 3/1998 | Fackler et al. | 340/825.04 |
| 5,828,905 | 10/1998 | Rao | 395/883 |

*Primary Examiner*—Thomas C. Lee
*Assistant Examiner*—Rehana Perveen
*Attorney, Agent, or Firm*—Stuart T. Auvinen

[57] ABSTRACT

A universal cable connects a personal computer's parallel port or PCMCIA socket to a variety of types of external peripheral devices. The universal cable contains a translator circuit that converts signals from the parallel port or PCMCIA socket to external interface signals. The translator circuit combines together bytes from the parallel port to output words when the external peripheral is an IDE or ATAPI device, or a subset of the ISA or AT bus. The translator circuit passes bytes through to 8-bit SCSI peripherals. The 16 data bits from the PCMCIA socket are passed through to IDE, ATAPI, and ISA devices, but split into bytes for SCSI devices. General-purpose I/O for external peripherals is also supported using separate input and output signals rather than bi-directional I/O. Software on the personal computer controls the configuration of the translator circuit, allowing the universal cable to be re-configured for different types of external peripherals. A 36-pin IEEE 1248-C connector is used to connect the universal cable to various external peripherals. A printer pass-through connector is provided on the translator's housing.

13 Claims, 10 Drawing Sheets

| Type | Function | Pin Number |
|---|---|---|
| Data | bit 0 | 2 |
| | bit 1 | 3 |
| | bit 2 | 4 |
| | bit 3 | 5 |
| | bit 4 | 6 |
| | bit 5 | 7 |
| | bit 6 | 8 |
| | bit 7 | 9 |
| Control | Strobe | 1 |
| | Auto Line Feed | 14 |
| | Initialize | 16 |
| | Select Printer/Device | 17 |
| Status | Acknowledge | 10 |
| | Busy | 11 |
| | Paper Out | 12 |
| | On-Line | 13 |
| | Error | 15 |

FIG. 3

| Pin | Signal |
|---|---|
| 1 | ground |
| 2 | D3 |
| 3 | D4 |
| 4 | D5 |
| 5 | D6 |
| 6 | D7 |
| 7 | -CE1 |
| 8 | A10 |
| 9 | -OE |
| 10 | A11 |
| 11 | A9 |
| 12 | A8 |
| 13 | A13 |
| 14 | A14 |
| 15 | -WE |
| 16 | IRQ |
| 17 | Vcc |
| 18 | Vpp1 |
| 19 | A16 |
| 20 | A15 |
| 21 | A12 |
| 22 | A7 |
| 23 | A6 |
| 24 | A5 |
| 25 | A4 |
| 26 | A3 |
| 27 | A2 |
| 28 | A1 |
| 29 | A0 |
| 30 | D0 |
| 31 | D1 |
| 32 | D2 |
| 33 | -IOIS16 |
| 34 | ground |

| Pin | Signal |
|---|---|
| 35 | ground |
| 36 | -CD1 |
| 37 | D11 |
| 38 | D12 |
| 39 | D13 |
| 40 | D14 |
| 41 | D15 |
| 42 | -CE2 |
| 43 | -RFSH |
| 44 | -IORD |
| 45 | -IOWR |
| 46 | A17 |
| 47 | A18 |
| 48 | A19 |
| 49 | A20 |
| 50 | A21 |
| 51 | Vcc |
| 52 | Vpp2 |
| 53 | A22 |
| 54 | A23 |
| 55 | A24 |
| 56 | A25 |
| 57 | RFU |
| 58 | RESET |
| 59 | -WAIT |
| 60 | -INPACK |
| 61 | -REG |
| 62 | SPKR |
| 63 | -STSCHG |
| 64 | D8 |
| 65 | D9 |
| 66 | D10 |
| 67 | -cd2 |
| 68 | ground |

FIG. 4

| Pin | IDE/ATAPI | ISA | SCSI | General I/O |
| --- | --- | --- | --- | --- |
| 1 | ground | ground | ground | ground |
| 2 | D8 | D8 | -BSY | OUT0 |
| 3 | D9 | D9 | -SEL | OUT1 |
| 4 | D10 | D10 | -ATN | OUT2 |
| 5 | D11 | D11 | -ACK | OUT3 |
| 6 | D12 | D12 | -REQ | OUT4 |
| 7 | D13 | D13 | -MSG | OUT5 |
| 8 | D14 | D14 | -C/D | OUT6 |
| 9 | D15 | D15 | -I/O | OUT7 |
| 10 | -IOIS16 | -IOIS16 | --- | OUT8 |
| 11 | -IOR | -IOR | --- | OUT9 |
| 12 | --- | DRQ | --- | OUT10 |
| 13 | --- | -DACK | --- | OUT11 |
| 14 | ground | ground | ground | ground |
| 15 | A2 | A2 | --- | -INSTB |
| 16 | -CS1 | -CS1 | --- | -OUTSTB |
| 17 | +5v | +5v | +5v | +5v |
| 18 | +5v | +5v | +5v | +5v |
| 19 | -RESET | -RESET | -RESET | -RESET |
| 20 | D7 | D7 | -D7 | IN7 |
| 21 | D6 | D6 | -D6 | IN6 |
| 22 | D5 | D5 | -D6 | IN5 |
| 23 | D4 | D4 | -D4 | IN4 |
| 24 | D3 | D3 | -D3 | IN3 |
| 25 | D2 | D2 | -D2 | IN2 |
| 26 | D1 | D1 | -D1 | IN1 |
| 27 | D0 | D0 | -D0 | IN0 |
| 28 | -IOW | -IOW | --- | IN8 |
| 29 | READY | READY | --- | IN9 |
| 30 | IRQ | IRQ | --- | IN10 |
| 31 | A1 | A1 | -SCSI | IN11 |
| 32 | A0 | A0 | -PTY | |
| 33 | -CS0 | -CS0 | --- | |
| 34 | ground | ground | ground | ground |
| 35 | ground | ground | ground | ground |
| 36 | -IDE/ATAPI | -IDE/ATAPI | -IDE/ATAPI | -IDE/ATAPI |

| Pin | PCMCIA IDE/ATAPI | PCMCIA ISA | PCMCIA SCSI | PCMCIA General I/O | Parallel Port |
|---|---|---|---|---|---|
| 1 | ground | ground | ground | ground | ground |
| 2 | D8 | D8 | -BSY | OUT0 | --- |
| 3 | D9 | D9 | -SEL | OUT1 | --- |
| 4 | D10 | D10 | -ATN | OUT2 | --- |
| 5 | D11 | D11 | -ACK | OUT3 | --- |
| 6 | D12 | D12 | -REQ | OUT4 | --- |
| 7 | D13 | D13 | -MSG | OUT5 | --- |
| 8 | D14 | D14 | -C/D | OUT6 | --- |
| 9 | D15 | D15 | -I/O | OUT7 | --- |
| 10 | -IOIS16 | -IOIS16 | --- | OUT8 | --- |
| 11 | -IOR | -IOR | --- | OUT9 | -AFD |
| 12 | --- | DRQ | --- | OUT10 | --- |
| 13 | --- | -DACK | --- | OUT11 | --- |
| 14 | ground | ground | ground | ground | ground |
| 15 | A2 | A2 | --- | -INSTB | PE |
| 16 | -CS1 | -CS1 | --- | -OUTSTB | -ERR |
| 17 | +5v | +5v | +5v | +5v | --- |
| 18 | +5v | +5v | +5v | +5v | --- |
| 19 | -RESET | -RESET | -RESET | -RESET | -INIT |
| 20 | D7 | D7 | -D7 | IN7 | D7 |
| 21 | D6 | D6 | -D6 | IN6 | D6 |
| 22 | D5 | D5 | -D6 | IN5 | D5 |
| 23 | D4 | D4 | -D4 | IN4 | D4 |
| 24 | D3 | D3 | -D3 | IN3 | D3 |
| 25 | D2 | D2 | -D2 | IN2 | D2 |
| 26 | D1 | D1 | -D1 | IN1 | D2 |
| 27 | D0 | D0 | -D0 | IN0 | D0 |
| 28 | -IOW | -IOW | --- | IN8 | -STB |
| 29 | READY | READY | --- | IN9 | --- |
| 30 | IRQ | IRQ | --- | IN10 | SLCT |
| 31 | A1 | A1 | -SCSI | IN11 | BUSY |
| 32 | A0 | A0 | -PTY | --- | -ACK |
| 33 | -CS0 | -CS0 | --- | --- | -SLIN |
| 34 | ground | ground | ground | ground | ground |
| 35 | ground | ground | ground | ground | ground |
| 36 | -CIN | -CIN | -CIN | -CIN | -CIN |

FIG. 11

TRANSLATOR WITH SELECTABLE FIFO FOR UNIVERSAL HUB CABLES FOR CONNECTING A PC'S PCMCIA OR PARALLEL PORTS TO VARIOUS PERIPHERALS USING IDE/ATAPI, SCSI, OR GENERAL I/O

BACKGROUND OF THE INVENTION—FIELD OF THE INVENTION

This invention relates to personal computers, and more particularly to multi-use cables for connecting external devices to a personal computer.

BACKGROUND OF THE INVENTION—DESCRIPTION OF THE RELATED ART

Personal computers (PC's) have gained enormous popularity and acceptance in large part due to the expandability of PC's. A PC can be expanded by installing AT or PCI bus cards on an internal AT or PCI bus. Modems, graphics accelerators, and other controllers are commonly added to PC's using the internal expansion busses.

Adding an AT or PCI-bus card to the internal busses of a PC is difficult for many consumers. The chassis of the PC must be opened up to expose the electronics inside the PC. The consumer must firmly push the new expansion card into slots or edge connectors to physically install the card. The consumer can damage or break small electrical traces on the motherboard should he press the card in with too much force. With too little force the card may not make contact with all signals. Often some of the slots can accommodate the card while other slots cannot. Thus, internal expansion of a PC is undesirable for many PC owners.

The PC can also be expanded using external connectors. Many PC owners prefer external expansion devices because the PC's chassis does not have to be opened up. The user merely plugs a cable into an external connector on the back of the PC. The cable also connects to a separate chassis containing the external device.

Varieties of external devices are sold today. These devices often connect to the PC's parallel port or to a PCMCIA Personal Computer Memory Card International Association (PC-Card) socket. Parallel ports are still used for connecting external printers, although other external devices such as tape or disk drives are common. External Modems, CD-ROM drives, fixed and removable disk drives, scanners, and video cameras are often connected through a parallel port.

TOO MANY CABLES

While such variety in expansion devices is beneficial, the inventors have recognized that some problems plague PC users. Each external device is generally sold with its own cable to connect to the PC's parallel or PCMCIA ports. Sometimes users own more external devices than can be connected to the few parallel and PCMCIA ports on a PC. Users must constantly swap cables as different external devices are used. Reaching the connectors on the rear panel of the PC can require crawling around a desk.

Figure 1:
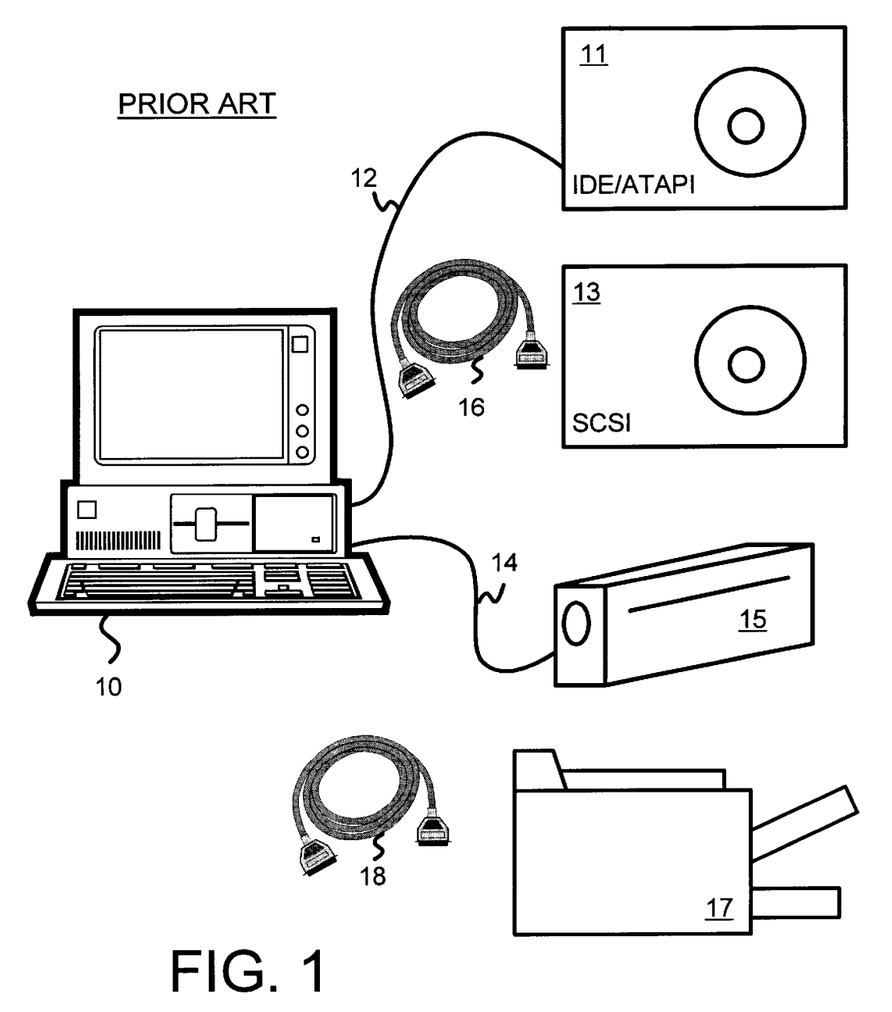
FIG. 1 is a diagram of a personal computer with a variety of external expansion devices.

FIG. 1 is a diagram of a personal computer with a variety of external expansion devices. PC 10 is an IBM-compatible personal computer with an internal AT/ISA bus or PCI bus. The PC user has installed an external hard disk 11. Cable 12 connects external hard disk 11 to either the parallel port or the PCMCIA connector on PC 10. External hard disk 11 uses the integrated-drive-electronics (IDE) protocol standard or the newer ATAPI (AT-Attachment Packet Interface) standard. Another standard is the small-computer-systems-interface SCSI standard. SCSI disk drive 13 requires a different SCSI cable 16 for connecting to PC 10. Other devices such as scanner 15 and printer 17 require additional cables 14, 18 for connecting to PC 10.

Usually different cables are used for the different kinds of devices. SCSI cable 16 cannot be used to connect external IDE hard disk 11 or scanner 15 to PC 10. Printer cable 18 may use a different connector for connecting to printer 17 than IDE cable 12 uses to connect to IDE hard disk 11. Thus, the cables are not interchangeable. A PC user must keep all cables and swap them as needed.

PC 10 is often a portable PC, such as a notebook or laptop PC. Carrying many bulky cables is undesirable for portable PC's. It is desirable to use one cable for multiple external devices to reduce travel weight for portable PC's.

INCOMPATIBLE PERIPHERAL INTERFACES

The various peripheral interfaces are not compatible with one another as they use different numbers of data bits and different control signals. For example, IDE/ATAPI peripherals and the AT-Bus use, 16 data bits, while the SCSI interface uses only 8 data bits. The parallel port uses 8 data bits, while PCMCIA uses 16 data bits. Thus the various peripheral interfaces and not compatible with each other.

Some dual-use cables have emerged. For example, U.S. Pat. No. 5,596,169 by Baker et al., and assigned to Iomega Corp. of Roy, Utah, describes a parallel-port cable modified for use with SCSI devices. The assignment of signals to twisted pairs in the cable is re-arranged to reduce cross-talk.

U.S. Pat. Nos. 5,408,669 and 5,535,371, by Stewart et al. and assigned to Dell USA of Austin Tex., describe a parallel port that can accept either an external floppy disk drive or a standard parallel printer, U.S. Pat. No. 5,457,785 by Kikinis et al., and assigned to Elonex Technologies of Sunnyvale, Calif. shows an external docking box for a parallel port.

While such a dual-use cable or an external docking box is useful, a universal cable is desired. It is desired to produce a cable with internal electronics to convert signals from the various standards used by external peripheral devices. It is desired to have a single cable for connecting external devices using IDE, SCSI, AT-Bus, or general-purpose I/O interfaces to a PC's parallel or PCMCIA port. It is desired to use a standard connector on the cable for connecting to the external devices.

SUMMARY OF THE INVENTION

A universal cable set connects an external peripheral device to a personal computer. The universal cable set has a parallel cable with a parallel-port connector that connects to a parallel port of the PC. That parallel port has parallel-port signals including no more than eight data signals and no address signals.

A translator in the parallel cable receives the parallel-port signals from the parallel-port connector. The translator converts the parallel-port signals to external interface signals. The external interface signals communicate with the external peripheral device.

An external connector at an end of the parallel cable receives the external interface signals from the translator. It temporarily couples to the external peripheral device. A programmable means in the translator converts the parallel-port signals into external interface signals for an integrated-device-electronics IDE interface, or into external interface signals for a small-computer-systems-interface SCSI interface. Thus, the parallel cable converts the parallel-port signals into either external interface signals for the IDE interface or for the SCSI interface.

In further aspects of the invention, the translator is contained in a housing. The housing has a printer connector that connects an external printer to the parallel cable connected to the external peripheral device and to the PC. A first flexible cable segment is between the parallel-port connector and the housing while a second flexible cable segment is between the external connector and the housing.

In still further aspects a second cable has a PCMCIA connector for connecting to a Personal Computer Memory Card International Association PCMCIA port of the PC. The PCMCIA port has PCMCIA-port signals including sixteen data signals and twenty-six address signals. A second translator in the second cable receives the PCMCIA-port signals from the PCMCIA connector. The second translator converts the PCMCIA-port signals to external interface signals. The external interface signals communicate with the external peripheral device.

A second external connector at an end of the second cable receives the external interface signals from the second translator. It temporarily couples to the external peripheral device. A second programmable means in the second translator converts the PCMCIA-port signals into external interface signals for the IDE interface, or into external interface signals for the SCSI interface. Thus, the second cable converts the PCMCIA-port signals into either external interface signals for the IDE interface or for the SCSI interface.

In further aspects of the invention, the programmable means and the second programmable means are configured to convert to either the IDE interface or to the SCSI interface by a software program executing in the PC. The software program transmits configuration information to the translator and to the second translator through the parallel cable and the second cable. Thus, conversion to IDE or SCSI is software controlled. The programmable means and the second programmable means further convert the parallel-port signals and the PCMCIA-port signals to an AT-bus interface. The AT-bus interface has a subset of signals in an internal AT bus inside the PC.

DETAILED DESCRIPTION

The present invention relates to an improvement in cables for personal computers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a single, universal cable can be constructed to interface a variety of external peripheral devices to a personal computer's parallel port. A second universal cable can be constructed to interface these external devices to the PC's PCMCIA socket. Thus, a PC user can carry just one or both universal cables to connect to a variety of external peripheral devices.

Translation is required to convert the parallel-port or PCMCIA interface signals to IDE, SCSI, AT-bus, or general I/O interfaces. This interface translation is performed by electronics embedded in the cable. Software installed on the PC controls the translation by downloading commands to the cable's electronics.

The cable connects to the external peripheral using a standard IEEE 1284-C male-type connector. Both the parallel port and the PCMCIA cable use the same IEEE 1248-C connector, allowing external peripherals to be connected to either the parallel or the PCMCIA port.

Figure 2A:
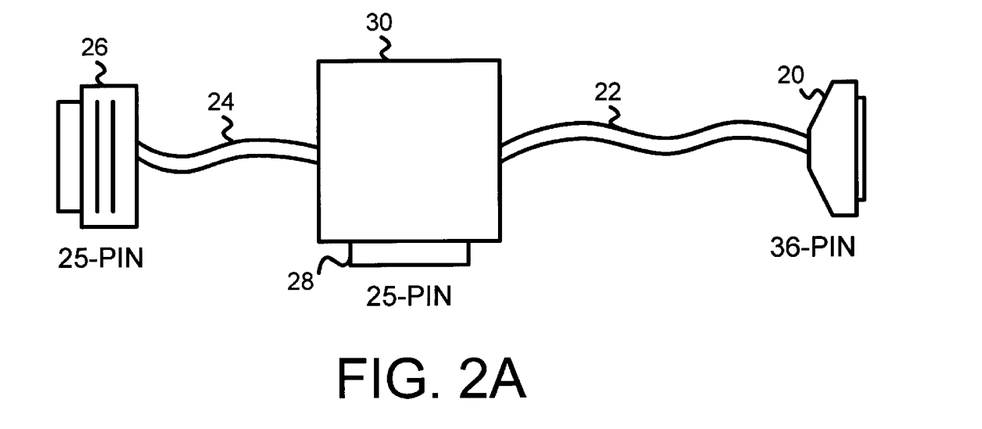
FIG. 2A is a diagram of a universal cable with embedded electronics for connecting a variety of external peripherals to the PC's parallel port.

FIG. 2A is a diagram of a universal cable with embedded electronics for connecting a variety of external peripherals to the PC's parallel port. Parallel-port connector 26 is a standard 25-pin D-type plug for connecting to a parallel-port connector on a PC. The parallel port standard uses 8 data bits but no address signals, although status and control signals are used.

Cable segment 24 connects parallel-port connector 26 to translator 30. Translator 30 contains signal-translation logic to convert parallel-port signals to IDE, SCSI, AT-bus, or general I/O signals. Translator 30 has mounted thereon a 25-pin D-type printer connector 28 for connecting the, universal cable to a printer or other parallel device. Printer signals can pass thorough translator 30 to an external printer, allowing both an external printer and an external peripheral to share the PC's parallel port.

The translated signals from translator 30 are coupled to the external peripheral device through cable segment 22. Physical connection to the external peripheral is made using external connector 20. External connector 20 is a standard 36-pin IEEE 1248-C plug.

Figure 2B:
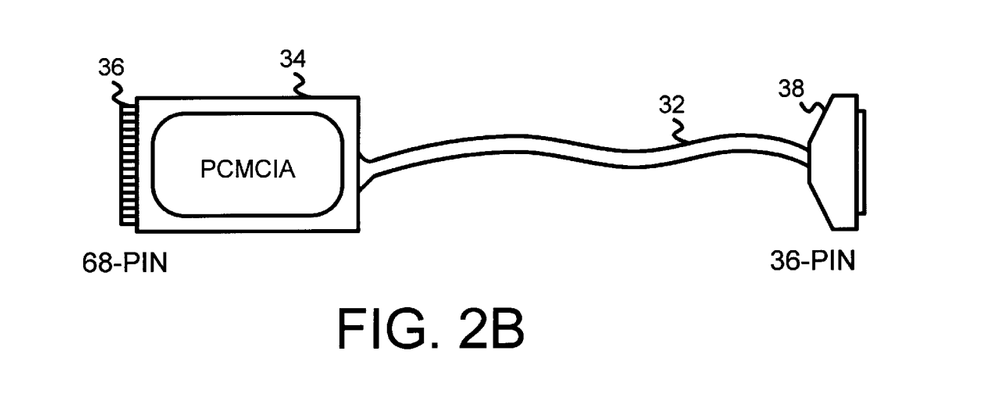
FIG. 2B is a diagram of a universal cable with embedded electronics for connecting a variety of external peripherals to the PCMCIA port.

FIG. 2B is a diagram of a universal cable with embedded electronics for connecting a variety of external peripherals to the PCMCIA port. PCMCIA connector 36 is a standard 68-pin PCMCIA connector for connecting to a PCMCIA socket on a PC. The PCMCIA standard uses 16 data bits and 26 address signals.

PCMCIA card 34 contains a translator with signal-translation logic to convert PCMCIA signals to IDE, SCSI, AT-bus, or general I/O signals. Cable segment 32 connects translated signals from the translator in PCMCIA card 34 to the external peripheral device. Physical connection to the external peripheral is made using external connector 38. External connector 38 is a standard 36-pin IEEE 1248-C plug, as was external connector 20 of the parallel-port cable of FIG. 2A. Thus, either the parallel-port cable or the PCMCIA cable can be connected to the external peripheral.

The two cables of FIGS. 2A, 2B together form a set of universal cables. The portable PC user need only carry the two cables to connect to a variety of external peripheral devices.

Parallel Port Interface

The parallel port in a PC is described in more detail in U.S. Pat. No. 5,293,497, issued to Gordon Free and assigned to Traveling Software of Bothell Wash. The parallel port uses a 25-pin D-type connector, and has 17 data and signal lines with the remaining 8 lines being ground.

Figure 3:
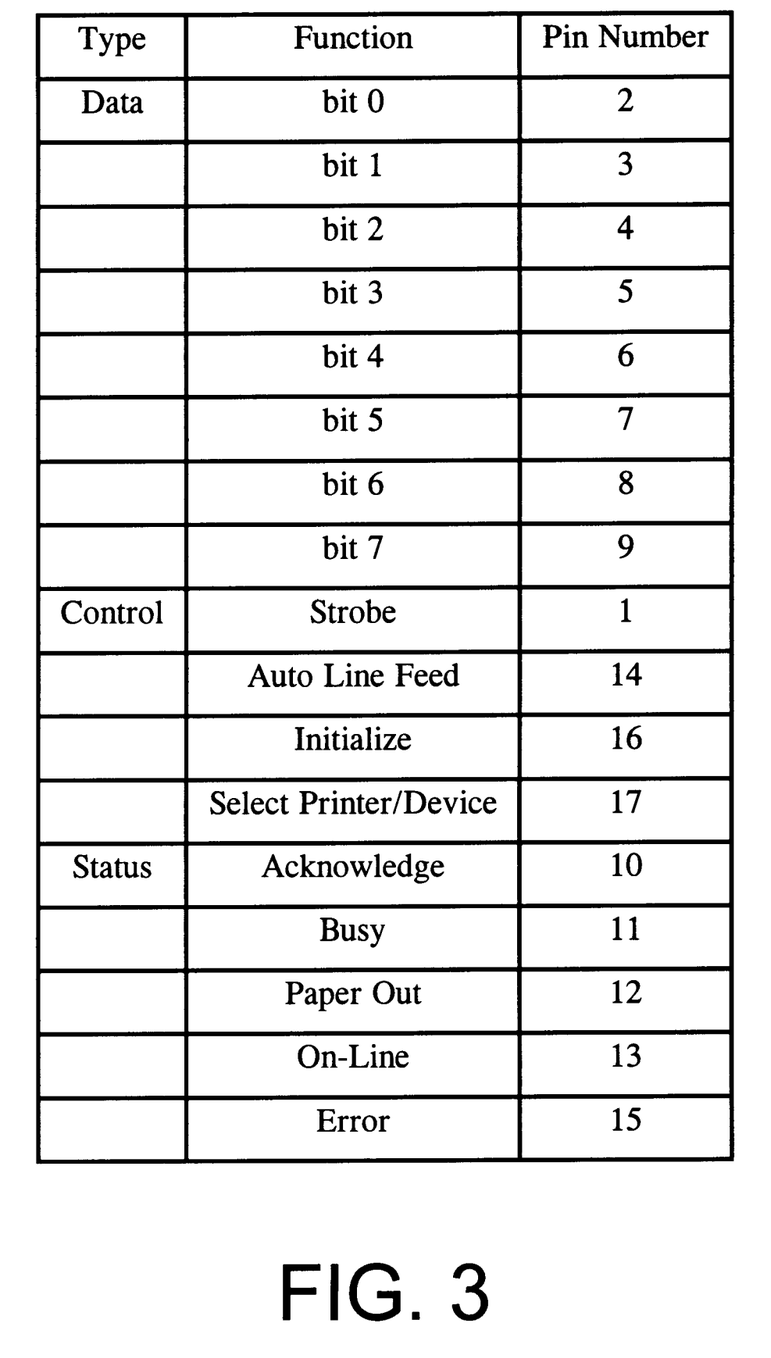
FIG. 3 shows a table illustrating the signals in the parallel port and their function.

The 17 signals include 8 data bits, 5 status lines and 4 control signals. In the original parallel port, the 8 data lines are sent from the PC to the printer, while the 5 status signals are received from the printer. The 4 control signals are also from the PC. A simple handshake is used where the PC outputs the data and raises a strobe control signal. Data is left on the parallel port data line until the printer responds by activating the acknowledge (ACK) status signal. Other handshakes have been devised to speed up the data transfer. For instance, the auto line-feed AFD signal is often used as a timing signal to indicate when to latch data from the parallel cable. FIG. 3 shows a table illustrating the signals in the parallel port and their function.

The signals in the parallel port are divided into three types: data and control from the PC, and status from the printer or other external device. Each of these three divisions has an I/O register within the PC. Many of the control and status signals are active-low signals rather than active-high signals. Active-low signals have better noise immunity for TTL-voltage-level signals that are commonly used in PC's.

PCMCIA Interface

Unlike the parallel port, which has no address lines, the PCMCIA interface uses 26 address bits for address decoding. The PCMCIA interface uses 16 data signals, twice as many as the parallel port. Various control signals such as I/O read and write strobes, chip-select and output-enable signals are contained in the PCMCIA interface. The PCMCIA interface was first used for memory expansion, and thus has several memory-specific signals such as Vpp programming voltage inputs.

Figure 4:
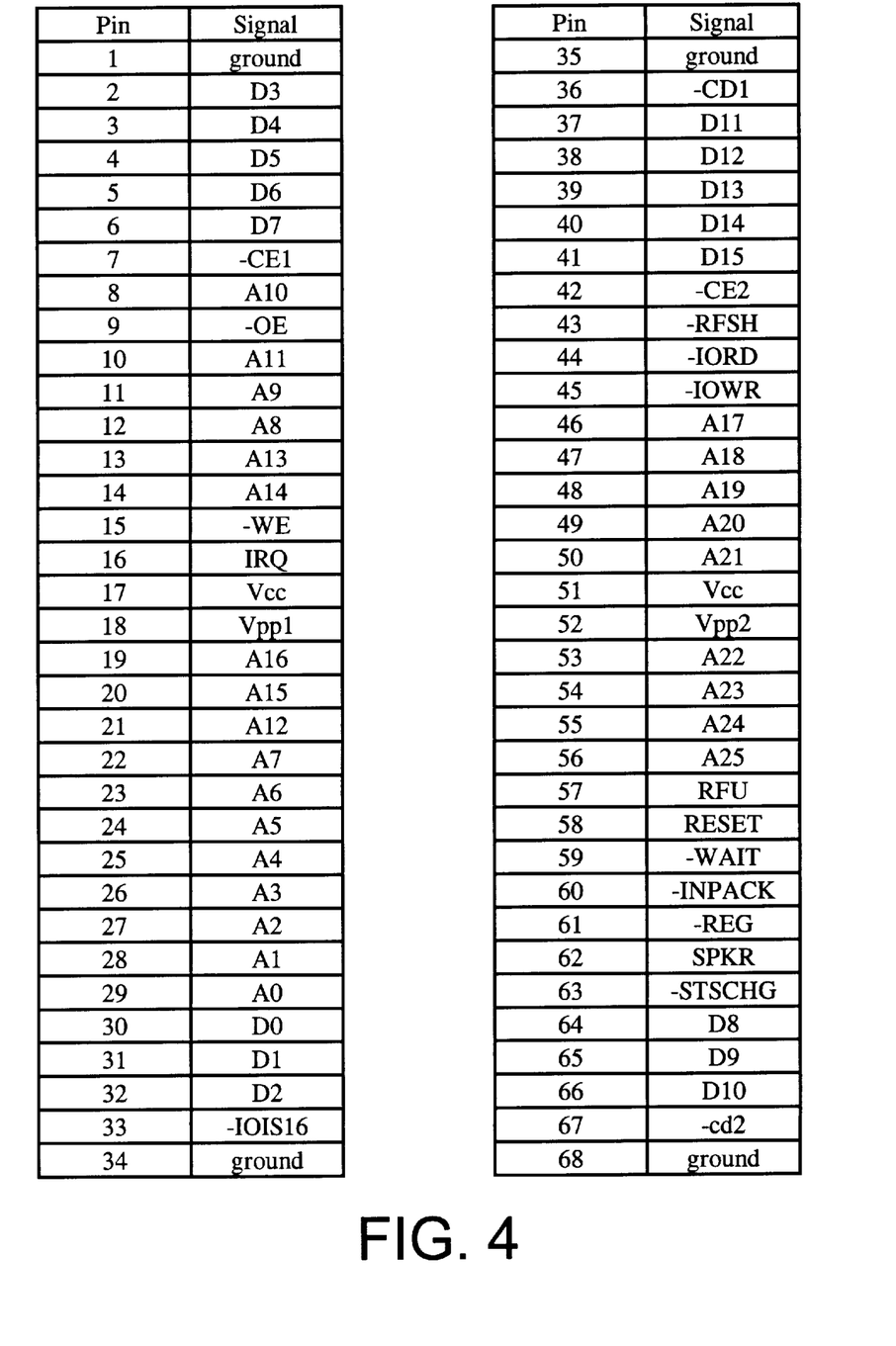
FIG. 4 is a table of signals in the PCMCIA interface.

Although 68 pins are used in the PCMCIA interface, a higher-density connector is used than for the parallel port. Thus, the PCMCIA socket is relatively small in size. FIG. 4 is a table of signals in the PCMCIA interface.

Interfaces to External Peripherals

Figure 5:
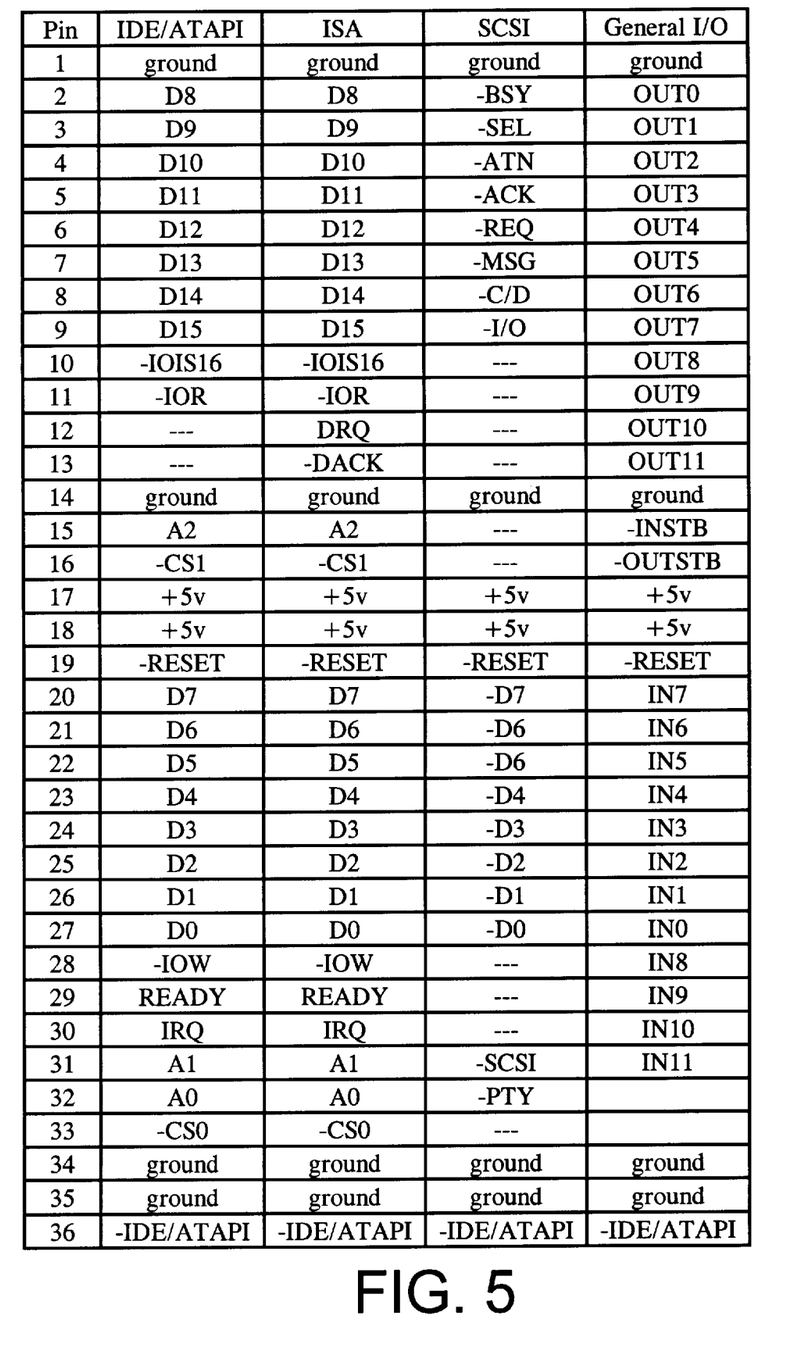
FIG. 5 is a table of the various interfaces to external peripherals over a universal cable using a 36-pin connector.

FIG. 5 is a table of the various interfaces to external peripherals over a universal cable using a 36-pin connector. The universal cables of FIGS. 2A, 2B each used a standard 36-pin connector to external peripherals. FIG. 5 shows the pin assignments of four external interfaces to the 36-pin connector. Active-low signals are preceded by a dash ("-").

The IDE/ATAPI interface and a subset of the AT-bus/Industry-Standard Architcture (ISA) interfaces each use 16 data bits but only three address signals. A0, and A1, and AZ. I/O read and write strobes IOR, IOW and chip-select signals CS0, CS1 are also used by both interfaces. READY and interrupt request (IRQ) are also used by both interfaces. The AT-bus interface also has direct-memory-access (DMA) request and acknowledge signals DRQ, DACK which are not used by the IDE interface.

The SCSI interface has only the lower 8 data signals D0 to D7, which are assigned to occupy the same pins as D0:7 for the IDE and ISA interfaces. SCSI control signals include busy (BSY), select (SEL), attention (ATN), request (REQ), acknowledge (ACK), message (MSG), control/data (C/D), Input/Output (IO), and parity (PTY). A SCSI signal is used for selection and data transfer.

A general-purpose I/O interface is useful for connecting other devices. The general I/O interface uses 12 inputs and 12 outputs rather than bi-directional data signals as do the other three interfaces. Input strobe INSTB and output strobe OUTSTB are used for timing data transfers.

All four interfaces use pins 1, 14, 34, and 35 for ground and pin 19 for reset. Pin 36 is used for all interfaces as a sensing pin to detect a SCSI device. SCSI devices pull pin 36 low, allowing hardware detection of SCSI devices. Software must test various pins or poll the external peripheral in other cases to determine what kind of device is attached.

Figure 6:
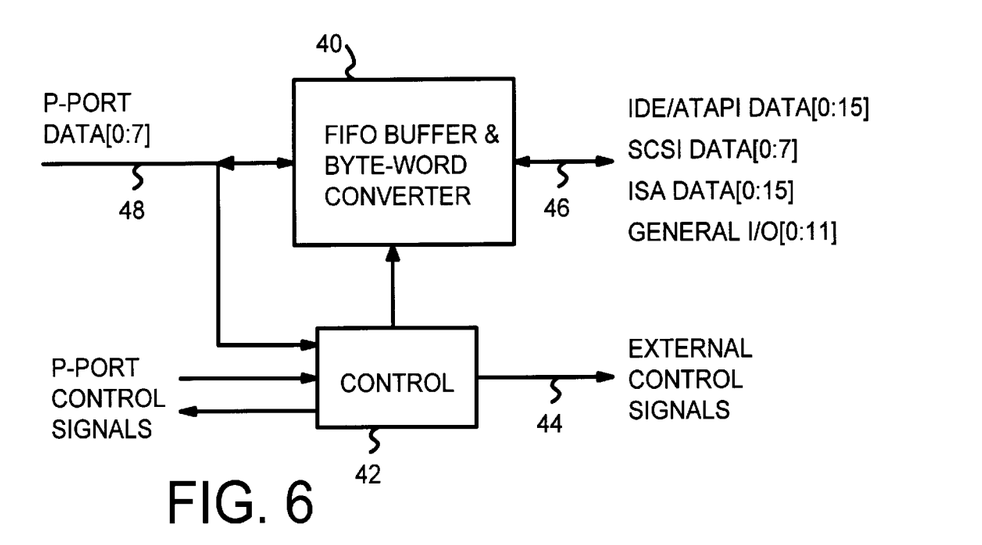
FIG. 6 is a diagram of a signal translator in a universal cable for translating signals from the parallel port.

Printer-port Translator—FIG. 6

FIG. 6 is a diagram of a signal translator in a universal cable for translating signals from the parallel port. The 8 data bits from the parallel port are input on data bus 48 from the PC. This is a bi-directional data bus. FIFO buffer 40 performs buffering, and converts the data width from the 8 bits of the parallel-port data bus 48 to the data width of external data bus 46. The width of external data bus 46 depends on the kind of external peripheral connected. SCSI peripherals also have 8 data bits, and thus for SCSI peripherals, FIFO buffer 40 merely buffers the bytes from parallel-port data bus 48. No width conversion is needed for SCSI. However, IDE/ATAPI and ISA peripherals use a 16-bit data bus, and FIFO buffer 40 combines two bytes from parallel-port data bus 48 into a single 16-bit word transmitted over external data bus 46. Incoming data from the external peripheral is split into two separate bytes by FIFO buffer 40.

General I/O uses separate input and output data busses, each 12-bits wide. FIFO buffer 40 combines one and a half bytes from parallel-port data bus 48 for output over external data bus 46 as a 12-bit word. Data input over external data bus 46 is buffered by FIFO buffer 40 to generate two bytes from every 12-bit word from the external general I/O peripheral device.

Control logic 42 receives software commands encoded in the data from the PC over parallel-port data bus 48. Other control signals from the parallel port such as strobe signals are used to increment pointers in FIFO buffer 40, and to generate external control signals 44 to the external peripheral, such as IO read and write strobes.

External data bus 46 is re-configured by software to the different data widths required by the various external peripheral interfaces. External data bus 46 is 8-bits wide for SCSI devices, 16-bits wide for IDE/ATAPI and ISA interfaces, and a total of 24-bits wide for general-purpose I/O, which has 12 data inputs and 12 data outputs.

Figure 7:
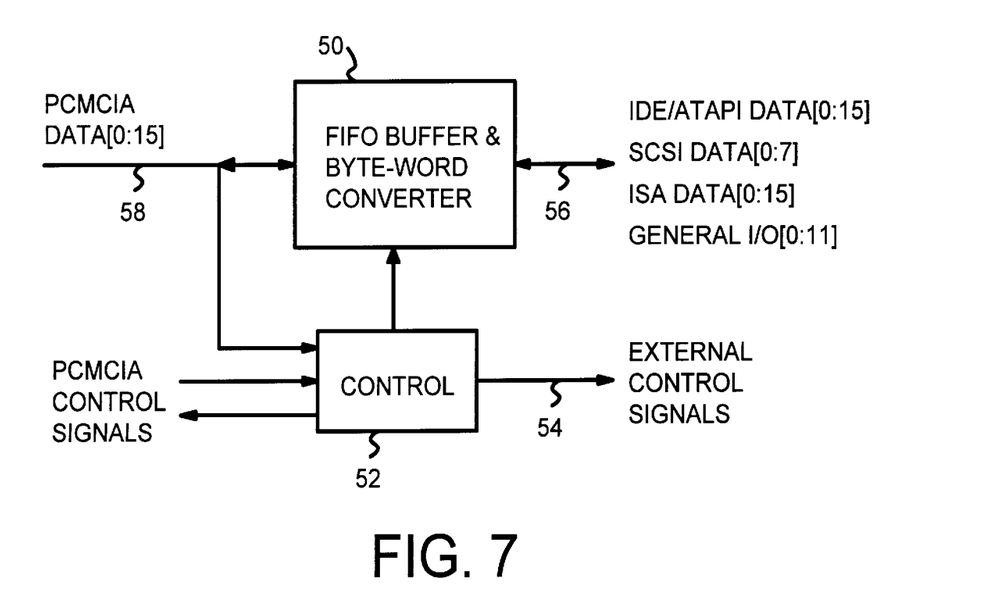
FIG. 7 is a diagram of a signal translator in a universal cable for translating signals from the PCMCIA port.

PCMCIA-port Translator—FIG. 7

FIG. 7 is a diagram of a signal translator in a universal cable for translating signals from the PCMCIA port. The 16 data bits from the PCMCIA port are input on data bus 58 from the PC. This is a bi-directional data bus. FIFO buffer 50 performs buffering, and converts the data width from the 16 bits of the PCMCIA-port data bus 58 to the data width of external data bus 56. The width of external data bus 56 is dependent upon the kind of external peripheral connected. IDE/ATAPI peripherals also have 16 data bits, and thus for IDE/ATAPI peripherals, FIFO buffer 50 merely buffers the 2-byte words from PCMCIA-port data bus 58. No width conversion is needed for IDE/ATAPI. However, SCSI peripherals use an 8-bit data bus, and FIFO buffer 50 splits the two-byte word from PCMCIA-port data bus 58 into 2 bytes transmitted over external data bus 56. Incoming data from the external SCSI peripheral is combined into one 16-bit word by FIFO buffer 50.

General I/O uses separate input and output data busses, each 12-bits wide. FIFO buffer 50 combines one and a half bytes from PCMCIA-port data bus 58 for output over external data bus 56 as a 12-bit word. Data input over external data bus 56 is buffered by FIFO buffer 50 to generate one 16-bit words from every 12-bit word from the external general I/O peripheral device.

Control logic 52 receives software commands encoded in the data from the PC over PCMCIA-port data bus 58. Other control signals from the PCMCIA port such as strobe signals are used to increment pointers in FIFO buffer 50, and to generate external control signals 54 to the external peripheral, such as IO read and write strobes.

External data bus 56 is re-configured by software to the different data widths required by the various external peripheral interfaces. External data bus 56 is 8-bits wide for SCSI devices, 16-bits wide for IDE/ATAPI and ISA interfaces, and a total of 24-bits wide for general-purpose I/O, which has 12 data inputs and 12 data outputs.

Figure 8:
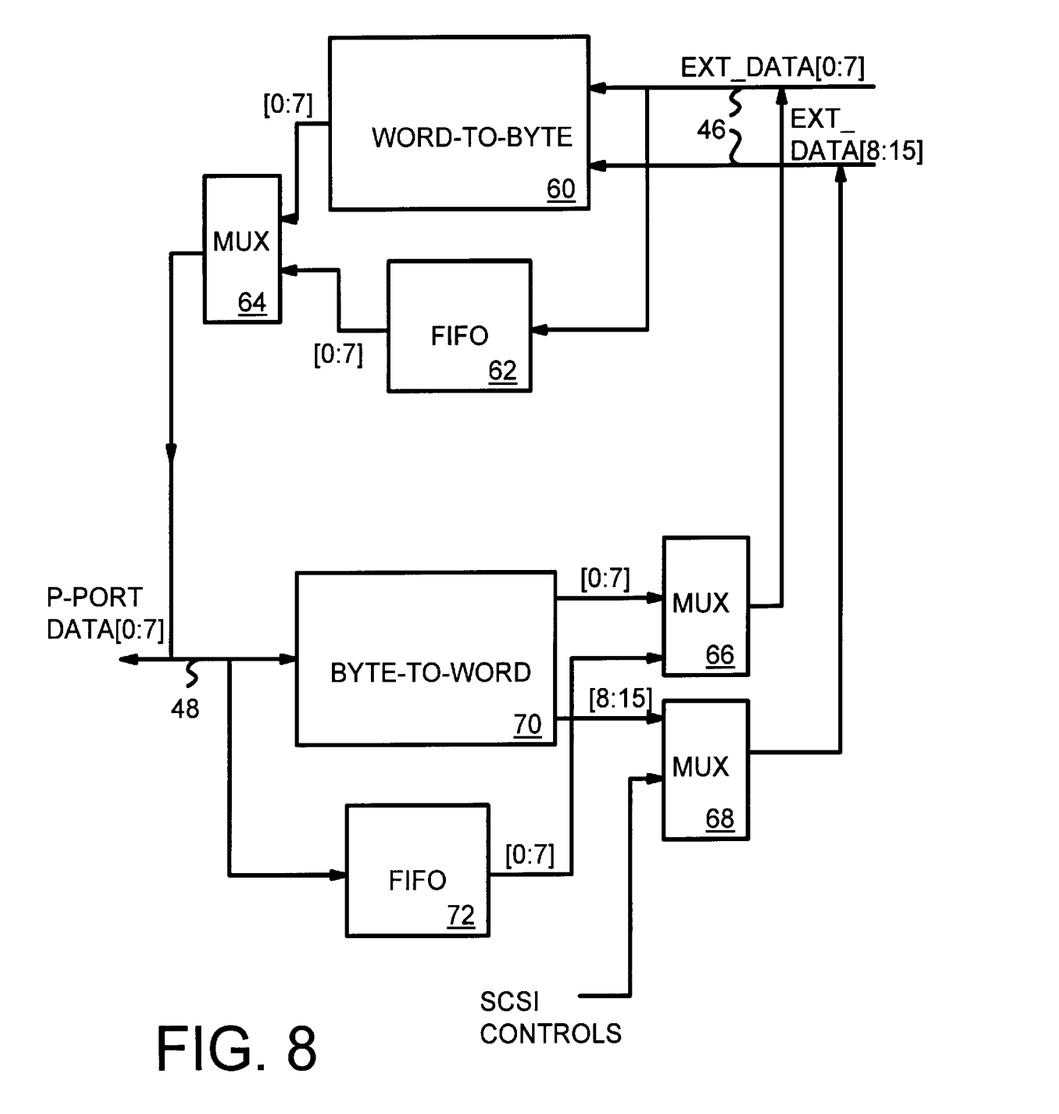
FIG. 8 is a detailed diagram of a translator for a universal cable for connecting with the parallel port.

Details of Parallel-port Cable Translator—FIG. 8

FIG. 8 is a detailed diagram of a translator for a universal cable for connecting with the parallel port. The translator of FIG. 8 is re-configured by software to translate data and control signals to the external peripheral's interface.

For SCSI mode, the 8 data bits from parallel-port data bus 48 are buffered by FIFO 72 and transmitted through multiplexer or mux 66 to the lower 8 bits of external data bus 46. The upper 8 bits of external data bus 46 are used for SCSI control signals, which are generated by control logic (not shown) and selected by mux 68. Return data from an external SCSI device received over external data bus 46 is simply buffered by FIFO 62. Mux 64 selects the 8-bit output from FIFO 62 to be driven to parallel-port data bus 48 when SCSI mode is programmed by software executing on the PC. SCSI handshaking logic receives and generates SCSI control signals over the upper 8 bits of external data bus 46.

For IDE and ISA modes, software configures muxes 66, 68, 64 to select the other inputs. Converter 70 receives bytes from parallel-port data bus 48 and combines every pair of bytes into a 16-bit word. The lower 8 bits are selected by mux 66 and transmitted over the lower 8 bits of external data bus 46, while the upper 8 bits are selected by mux 68 and transmitted as the upper 8 bits of external data bus 46.

The 16-bit words from the external IDE or ISA peripherals are split into bytes by converter 60. These bytes are each successively output to mux 64 and transmitted back to the PC over parallel-port data bus 48.

For general-purpose I/O, converter 70 combines every two bytes into one 12-bit word, which is output through mux 66 to external data bus 46. Converter 60 generates two bytes from every 12-bit word input from the external peripheral over external data bus 46. Mux 64 transmits the converted bytes from converter 60 to the PC over parallel-port data bus 48.

Figure 9:
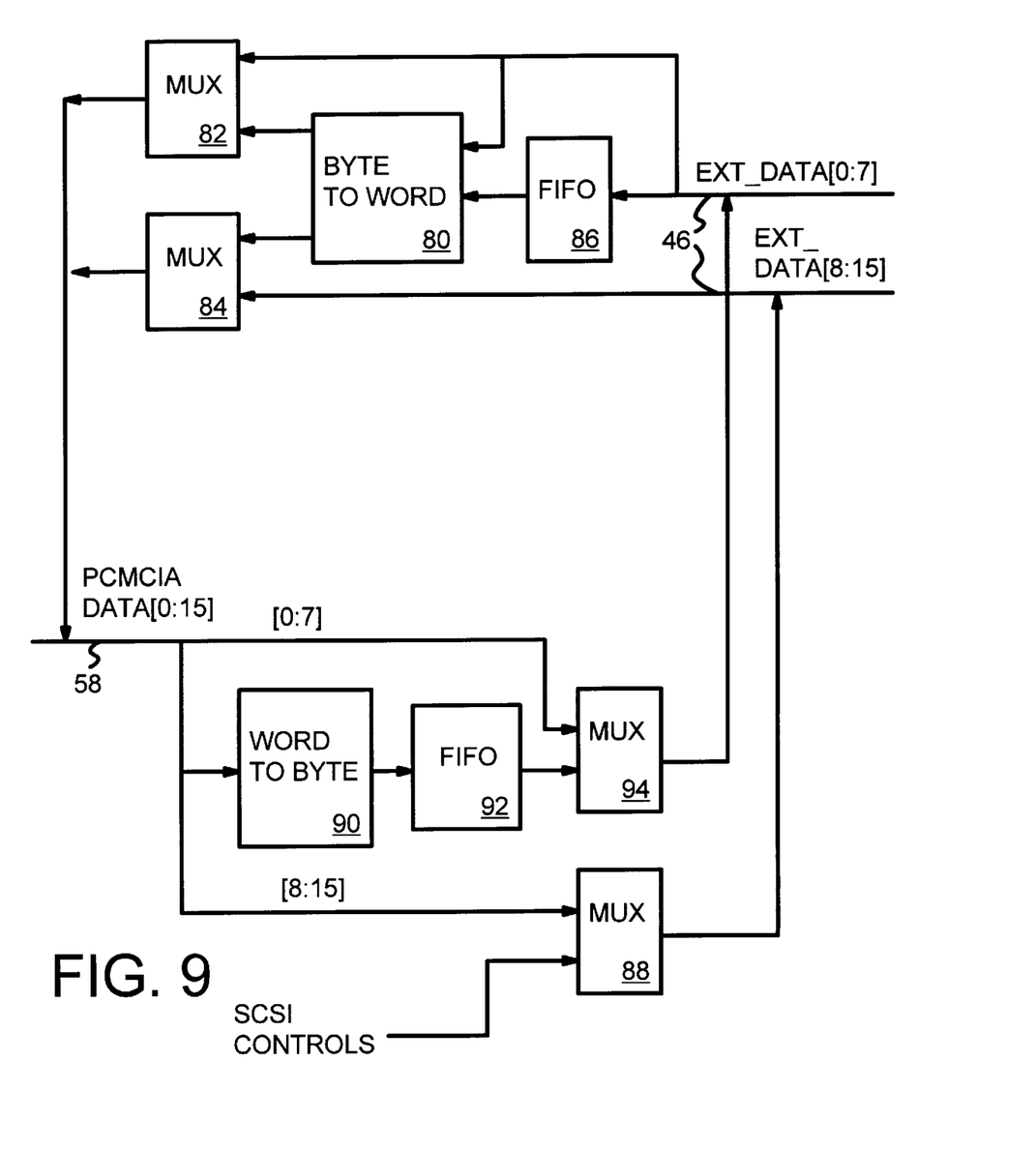
FIG. 9 is a detailed diagram of a translator for a universal cable for connecting with the PCMCIA port.

Details of PCMCIA-port Cable Translator—FIG. 9

FIG. 9 is a detailed diagram of a translator for a universal cable for connecting with the PCMCIA port. The translator of FIG. 9 is re-configured by software to translate data and control signals to the external peripheral's interface.

For SCSI mode, the 16 data bits from PCMCIA-port data bus 58 are split into two bytes by converter 90 and the bytes are buffered by FIFO 92. These bytes are transmitted through mux 94 to the lower 8 bits of external data bus 46. The upper 8 bits of external data bus 46 are used for SCSI control signals, which are generated by control logic (not shown) and selected by mux 88. Return data from an external SCSI device received over external data bus 46 is buffered by FIFO 86, a 32-byte buffer. The byte stored in FIFO 86 is combined by converter 80 with the next byte from the lower 8 bits of external data bus 46. Mux 82 selects the lower 8-bit output from converter 80 while mux 84 selects the upper 8 bits from converter 80. Together muxes 82, 84 drive the 16-bit PCMCIA-port data bus 58 when SCSI mode is programmed by software executing on the PC. SCSI handshaking logic receives and generates SCSI control signals over the upper 8 bits of external data bus 46.

For IDE and ISA modes, software configures muxes 82, 84, 88, 94 to select the other inputs. Converter 90 is disabled. Each 2-byte word from PCMCIA-port data bus 58 is selected by muxes 94, 88 and output onto external data bus 46. Mux 94 selects the lower 8 bits from PCMCIA-port data bus 58, while mux 88 selects the upper 8 bits from data bus 58.

The 16-bit words from the external IDE or ISA peripherals are also passed through back to the PC. Mux 82 select the lower 8 bits of external data bus 46 while mux 84 selects the upper 8 bits from external data bus 46. Muxes 82, 84 drive the PCMCIA-port data bus 58. Converter 80 is disabled for IDE and ISA modes.

For general-purpose I/O, converter 90 combines every 16-bit word into one 12-bit word. The upper 4 bits are discarded. Muxes 82, 84 transmits the converted words from converter 80 to the PC over PCMCIA-port data bus 48.

Parallel and PCMCIA Universal Cable

Figure 10:
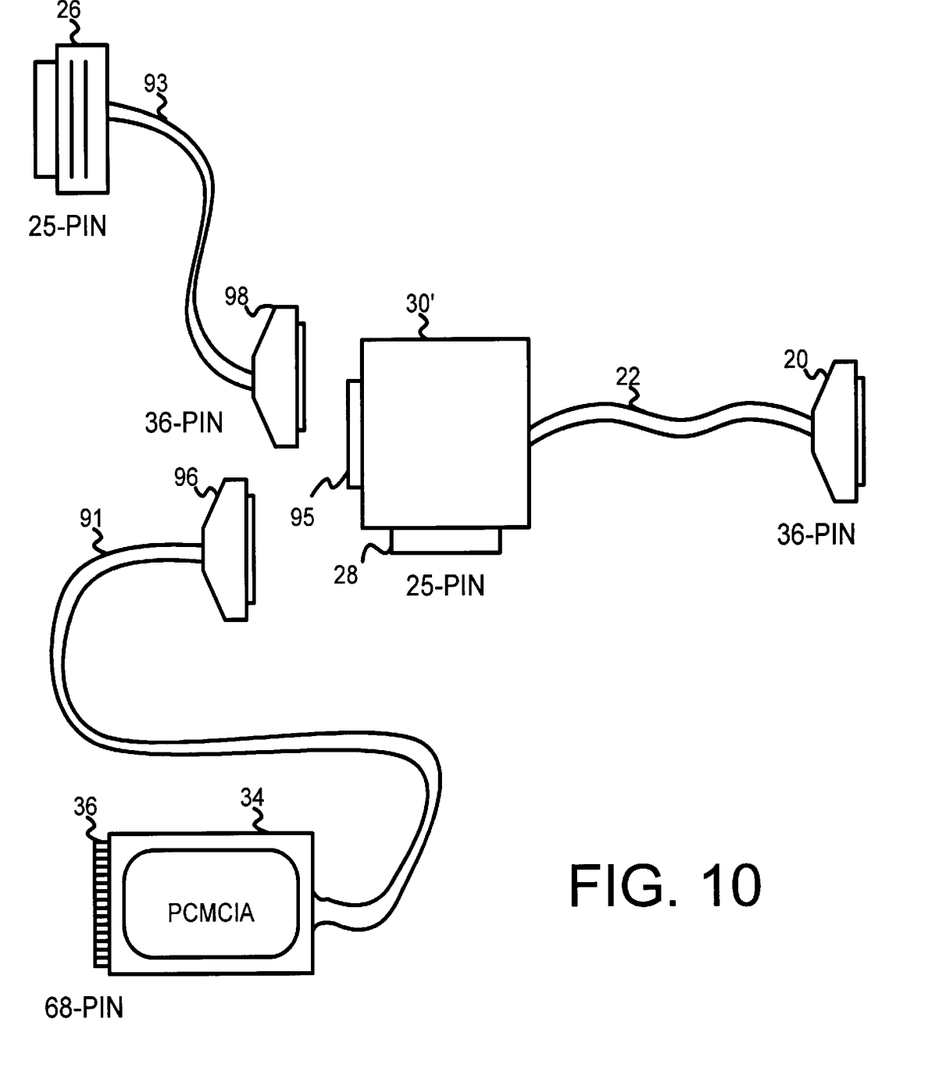
FIG. 10 is a diagram of an alternate embodiment using a single universal cable for connecting either a parallel port or a PCMCIA card to an external peripheral.

FIG. 10 is a diagram of an alternate embodiment using a single universal cable for connecting either a parallel port or a PCMCIA card to an external peripheral. Some PC users prefer to carry just a single cable rather than 2 separate cables as shown in FIGS. 2A, 2B. The alternate embodiment of FIG. 10 can connect an external peripheral to either the PC's parallel port or the PCMCIA socket.

Parallel-port connector 26 is a standard 25-pin D-type connector that fits into a PC's parallel-port receptacle. Cable segment 93 connects parallel-port connector 26 to translator 30'. Translator 30' contains signal-translation logic to convert parallel-port signals to IDE, SCSI, AT-bus, or general I/O signals. Translator 30' has mounted thereon a 25-pin D-type printer connector 28 for connecting the universal cable to a printer or other parallel device. Printer signals can pass thorough translator 30 to an external printer, allowing both an external printer and an external peripheral to share the PC's parallel port.

The translated signals from translator 30' are coupled to the external peripheral device through cable segment 22.

Physical connection to the external peripheral is made using external connector 20. External connector 20 is a standard 36-pin IEEE 1248-C plug.

Unlike the parallel-port cable of FIG. 2A, cable segment 93 does not connect directly and permanently to translator 30'. Instead, cable segment 93 ends at plug 98, which fits in receptacle 95 on translator 30'. Plug 98 is preferably an IEEE 1248-C connector with 36 pins, like external connector 20. Using connectors rather than permanent wiring to translator 30' allows either parallel-port cable segment 93 or PCMCIA cable segment 91 to be connected to translator 30' and hence to the external peripheral device.

PCMCIA-cable plug 96 is another IEEE 1248-C connector with 36 pins, allowing the PC's PCMCIA socket rather than the PC's parallel port to connect to the external peripheral device. Plug 96 is coupled to PCMCIA cable segment 91, which receives translated signals from the PC's PCMCIA socket.

PCMCIA connector 36 is a standard 68-pin PCMCIA connector for connecting to the PCMCIA socket on a PC. PCMCIA card 34 contains another translator with signal-translation logic to convert PCMCIA signals to IDE, SCSI, AT-bus, or general I/O signals. Cable segment 91 connects translated signals from the translator in PCMCIA card 34 to the external peripheral device. Translator 30' is configured by software to pass all signals through to external connector 20 when the PCMCIA cable segment is connected. Translator 30' is a parallel-port translator such as shown in FIG. 8, while PCMCIA card 34 contains a PCMCIA translator such as shown in FIG. 9. Translator 30' is effectively disabled by being placed in a pass-thorough mode when the PCMCIA translator in PCMCIA card 34 is translating signals to the external interface.

Thus, either the parallel-port cable or the PCMCIA cable can be connected to the external peripheral thorough translator 30'. The three cable segments of FIG. 10 together form a universal cable. The portable PC user need only carry the universal cable to connect to a variety of external peripheral devices.

Figure 11:
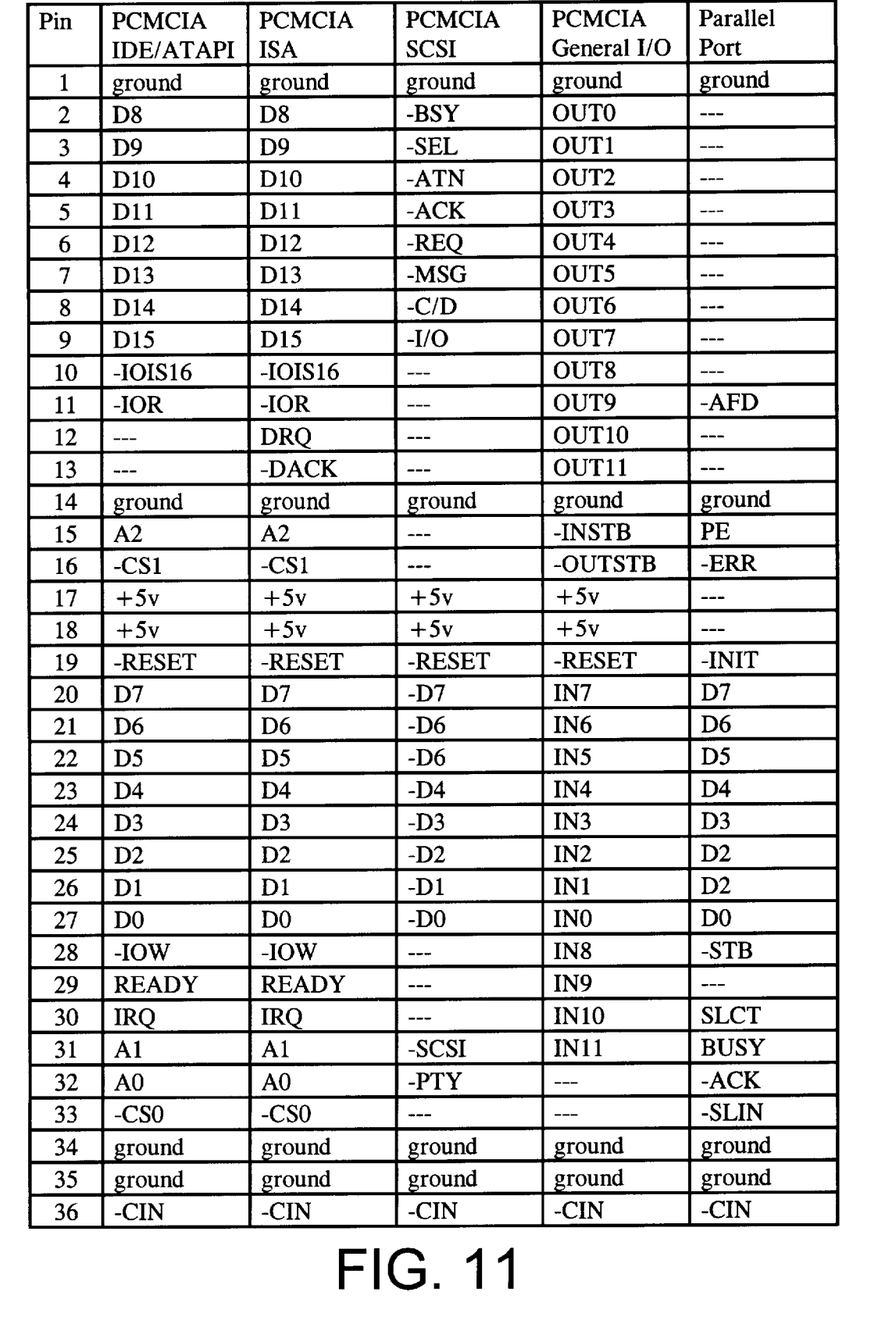
FIG. 11 highlights the mapping of signals from the parallel port and PCMCIA card thorough the receptacle of FIG. 10.

FIG. 11 highlights the mapping of signals from the parallel port and PCMCIA card thorough receptacle 95 of FIG. 10. Receptacle 95 is a 36-pin connector. Signals on PCMCIA cable segment 91 have already been translated to the 36-pin external interface, either IDE/ATAPI, SCSI, ISA, or general I/O. FIG. 11 shows the example of PCMCIA signals translated to the IDE, ISA, SCSI, and general I/O interfaces. These signals are merely passed through translator 30 without change.

The signals from the parallel-port cable segment 93 are mapped to the 36-pin plug 98 as shown in FIG. 11. Since the parallel port has only 8 data bits and no address bits, relatively few of the 36 signals are used. However, the 8 data signals occupy the same pins as for the PCMCIA interface to simplify wiring in translator 30'.

Advantages of the Invention

The invention allows the PC user to reduce the number and types of cables needed to connect various external peripheral devices to the PC's parallel port. A single cable can connect the parallel port to any of several different kinds of external peripherals using different interfaces. The translator in the cable allows the parallel-port signals to be converted into IDE or ATAPI signals used by disk drives, or into SCSI signals which use a different interface. Translation into an ISA/AT-bus subset or general-purpose I/O is also supported using the same cable. Peripherals such as scanners often use a subset of the AT bus. Computerized lab equipment often uses general I/O, where the inputs are separate from the outputs.

Portable PC users are especially benefited by the reduced number and types of cables that must be carried on the road. The translator in the cable allows a single cable to interface to a variety of external devices than the portable PC user may encounter while away from the office. The PCMCIA cable is useful with portable PC's since many laptop and notebook PC's that have the high-density PCMCIA socket.

Alternate Embodiments

Several other embodiments are contemplated by the inventors. For example, other configurations of the logic of the translators are possible. Multiplexers can be construed in many ways and can be combined rather than physically existing as separate mux cells. Other external interfaces can be added or substituted. Software control allow the translator to adapt to new interfaces as they emerge. Software updates can be sent to the user to enable these new interfaces.

The electronics in the cable can be self-powered. This is useful when the external peripheral is a disk drive with its own power source. When the disk drive is turned off, the electronics in the cable must get power from the PC's parallel port so that the printer connector is enabled. Power can be extracted from the parallel port's data and control signals by attaching diodes to each data and signal line. The current through these diodes can then be stepped-up in voltage to generate a 5-volt power source.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A hub cable for connecting a personal computer (PC) to an external peripheral, the hub cable comprising:

flexible cable segments;

a translator, coupled to the flexible cable segments, for converting data from the PC into external data for transmission to the external peripheral in a variety of external-interface formats, the variety of external-interface formats including an integrated-drive-electronics IDE interface, a small-computer-systems-interface SCSI interface, and an industry-standard-architecture ISA-bus interface, the translator having:

a converter, receiving the data from the parallel port as 8-bit bytes, for combining bytes from the parallel port to generate 16-bit words of the external data;

a first-in-first-out FIFO buffer, receiving bytes of the data from the parallel port, for outputting the bytes as external data without change in data width; and a selector, responsive to configuration commands from the software control program on the PC, for selecting the words from the converter when the external peripheral uses the IDE or the ISA-bus interface, but selecting the bytes of external data from the FIFO buffer when the external peripheral uses the SCSI interface;

an external connector, coupled to the translator through a first flexible cable segment, the external connector for plugging into a receptacle in the external peripheral; and a parallel-port connector, coupled to the translator through a second flexible cable segment, for connecting to the PC through a standard parallel-port of the PC, whereby the data from the PC is translated into the external data for the IDE interface, the SCSI interface, or the ISA-bus interface.

2. The hub cable of claim 1 wherein the translator includes configuration means, receiving commands from control software executing on the PC, for configuring data conversion in the translator to output the external data for the IDE interface, for the SCSI interface, of for the ISA-bus interface, whereby the hub cable is re-configured by software for different interfaces.

3. The hub cable of claim 2 wherein the control software executing on the PC detects a SCSI peripheral by reading a signal in the external connector, whereby the control software auto-detects SCSI peripherals.

4. The hub cable of claim 1 wherein the translator is coupled to the flexible cable segments which are coupled to the PC through a removable plug, whereby the translator is removably connected to the PC.

5. The hub cable of claim 4 further comprising:

a Personal Computer Memory Card International Association PCMCIA connector mounted on a PCMCIA card, coupled to the translator through a third flexible cable segment, for connecting to the PC through a standard PCMCIA socket of the PC, wherein the PCMCIA card fits inside the PCMCIA socket on the PC; and a second translator inside the PCMCIA card, for converting PCMCIA data and control signals to the external data for transmission to the external peripheral in the variety of external-interface formats, the variety of external-interface formats including the IDE interface, the SCSI interface, and the ISA-bus interface;

wherein the third flexible cable segment carries the external data generated by the second translator to the translator, the translator passing the external data through to the external connector, whereby the hub cable connects to the PC through the parallel port or through the PCMCIA socket.

6. The hub cable of claim 1 wherein the translator further comprises:

a reverse converter, receiving 16-bit external data words from the external connector, for converting the 16-bit external data words to bytes for transmission to the parallel port;

a reverse FIFO, receiving bytes of external data from the external connector, for buffering the bytes to the parallel port without changing data width, and a reverse selector, responsive to the configuration commands from the software control program on the PC, for selecting the bytes from the reverse converter when the external peripheral uses the IDE or the ISA-bus interface, but selecting the bytes from the reverse FIFO when the external peripheral uses the SCSI interface, whereby reverse data is converted for the IDE interface and the ISA-bus interface, but the data width is not changed for the SCSI interface.

7. A translator in a cable, the cable for connecting a parallel port of a personal computer to an external peripheral, the translator comprising:

a converter, receiving data from the parallel port as 8-bit bytes, for combining bytes from the parallel port to generate 16-bit words of external data;

a first-in-first-out FIFO buffer, receiving bytes of the data from the parallel port, for outputting the bytes as external data without change in data width;

a selector, responsive to configuration commands from a software control program on the personal computer, for selecting the words from the converter when the external peripheral uses an integrated-device-electronics IDE or an industry-standard-architecture ISA-bus interface, but selecting the bytes of external data from the FIFO buffer when the external peripheral uses a small-computer-systems-interface SCSI interface, a reverse converter, receiving 16-bit external data words from the external peripheral, for converting the 16-bit external data words to bytes for transmission to the parallel port;

a reverse FIFO, receiving bytes of external data from the external peripheral, for buffering the bytes to the parallel port without changing data width, and a reverse selector, responsive to the configuration commands from the software control program on the PC, for selecting the bytes from the reverse converter when the external peripheral uses the IDE or the ISA-bus interface, but selecting the bytes from the reverse FIFO when the external peripheral uses the SCSI interface, whereby reverse data is converted for the IDE interface and the ISA-bus interface, but the data width is not changed for the SCSI interface.

8. The translator of claim 7 further comprising:

self-powering means, coupled to data and control signals from the parallel port, for sinking current from the data and control signals and generating a power source for the translator, whereby the translator in the cable is powered by the parallel port.

9. The translator of claim 8 wherein the self-powering means comprises:

a plurality of diodes, connected to the data and control signals from the parallel port, for extracting current from the data and control signals; and a voltage stepper, receiving the current from the plurality of diodes, for generating a power-supply voltage for the power source.

10. The hub cable of claim 1 wherein the translator is contained in a housing, the housing having a printer connector for connecting an external printer to the second flexible cable segment connected to the external peripheral and to the PC.

11. The hub cable of claim 5 wherein the PCMCIA connector comprises a 68-pin connector.

12. The hub cable of claim 11 wherein the external connector is a 36-pin connector containing 36 interface signals.

13. The hub cable of claim 11 wherein the external connector is an IEEE-1248-C connector.

* * * * *